(12) United States Patent
Hu et al.

(10) Patent No.: US 12,277,315 B2
(45) Date of Patent: Apr. 15, 2025

(54) PERSISTENCE LOGGING OVER NVM EXPRESS FOR STORAGE DEVICES APPLICATION

(71) Applicant: Huawei Technologies Co., Ltd., Shenzhen (CN)

(72) Inventors: Chaohong Hu, San Jose, CA (US); Chun Liu, San Jose, CA (US); Xin Liao, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/365,111

(22) Filed: Aug. 3, 2023

(65) Prior Publication Data
US 2023/0376201 A1 Nov. 23, 2023

Related U.S. Application Data

(63) Continuation of application No. PCT/US2021/016587, filed on Feb. 4, 2021.

(51) Int. Cl.
*G06F 3/06* (2006.01)

(52) U.S. Cl.
CPC .......... *G06F 3/0604* (2013.01); *G06F 3/0644* (2013.01); *G06F 3/0659* (2013.01); *G06F 3/0679* (2013.01)

(58) Field of Classification Search
CPC .... G06F 3/0604; G06F 3/0644; G06F 3/0659; G06F 3/0679; G06F 2212/1024; G06F 2212/7201; G06F 2212/7207; G06F 12/0246
See application file for complete search history.

(56) References Cited

U.S. PATENT DOCUMENTS

| | | | |
|---|---|---|---|
| 11,768,620 B2* | 9/2023 | Singh | G06F 3/0659 |
| | | | 711/114 |
| 2020/0167274 A1* | 5/2020 | Bahirat | G06F 3/0616 |
| 2020/0393974 A1 | 12/2020 | Bahirat | |
| 2020/0409589 A1* | 12/2020 | Bennett | G06F 3/0616 |

(Continued)

FOREIGN PATENT DOCUMENTS

| WO | WO-2022169450 A1 | 8/2022 |
|---|---|---|
| WO | WO-2022169450 A8 | 7/2023 |

OTHER PUBLICATIONS

"International Application Serial No. PCT/US2021/016587, International Search Report mailed Nov. 10, 2021", 5 pgs.

(Continued)

*Primary Examiner* — Kenneth M Lo
*Assistant Examiner* — Jonah C Krieger
(74) *Attorney, Agent, or Firm* — Schwegman Lundberg & Woessner, P.A.

(57) ABSTRACT

A method of operating a computing system comprises defining a zoned namespace for non-volatile memory (NVM) of a memory device of the computing system, the zoned namespace including multiple NVM zones of multiple non-overlapping logical block addresses (LBAs) of the NVM, mapping persistence logging (PLOG) identifiers (IDs) to the NVM zones, a PLOG ID identifying a PLOG zone of one or more NVM zones, and performing a PLOG-specific access operation on a PLOG zone of the NVM in response to a PLOG-specific command received from a host device of the computing system.

20 Claims, 9 Drawing Sheets

(56) References Cited

U.S. PATENT DOCUMENTS

2022/0083256 A1* 3/2022 Muthiah .............. G06F 3/0604
2022/0083273 A1* 3/2022 Saito ................... G06F 3/0688

OTHER PUBLICATIONS

"International Application Serial No. PCT/US2021/016587, Written Opinion mailed Nov. 10, 2021", 7 pgs.
"International Application Serial No. PCT US2021 016587, International Preliminary Report on Patentability mailed Aug. 17, 2023", 9 pages.

* cited by examiner

| | BYTE 3 | BYTE 2 | BYTE 1 | BYTE 0 | |
|---|---|---|---|---|---|
| DWORD | 31 30 29 28 27 26 25 24 | 23 22 21 20 19 18 17 16 | 15 14 13 12 11 10 9 8 | 7 6 5 4 3 2 1 0 | |
| 0 | COMMAND IDENTIFIER | | FUSE | OPCODE | |
| 1 | NAMESPACE IDENTIFIER | | | | |
| 2 | PZSLBA | | | | 1052 |
| 3 | | | | | |
| 4 | PLOG ID | | | | 1060 |
| 5 | | | | | |
| 6 | | | | | |
| 7 | | | | | |
| 8 | | | | | |
| 9 | | | | | |
| 10 | PLOG SIZE | | | | 1065 |
| 11 | | | | | |
| 12 | LR FUA PRINFO | | NUMBER OF LOGICAL BLOCKS | | 1070 |
| 13 | PLOG STATUS | | | | |
| 14 | PLOG ID CONT | | | | 1060 |
| 15 | | | | | |

PERSISTENCE LOGGING OVER NVM EXPRESS FOR STORAGE DEVICES APPLICATION

CROSS REFERENCE TO RELATED APPLICATION

This application is a continuation of International Application No. PCT/US2021/016587, filed 4 Feb. 2021, entitled "Persistence Logging Over NVM Express for Storage Devices Application," the benefit of priority of which is claimed herein, and which application is incorporated herein by reference in its entirety.

BACKGROUND

Memory devices can include volatile and non-volatile memory. Volatile memory can require power to maintain data, and the volatile memory includes random-access memory (RAM), dynamic random-access memory (DRAM), synchronous dynamic random-access memory (SDRAM), or others. Non-volatile memory (NVM) can provide persistent data by retaining stored data when not powered and can include NAND flash memory and/or NOR flash memory, among others.

Some examples of memory devices are hard disk drives (HDDs), solid-state drives (SSDs), and storage class memories (SCMs). All these types of devices can include NVM. NVM express (NVMe) is a device interface protocol for accessing non-volatile memory of, among other things, SSDs and peripheral component interconnect express (PCIe) cards. There would be benefit to expanding NVMe to be an interface protocol that unifies the protocol used for HDDs, SSDs and SCMs. However, NVMe can be inefficient for some types of data transfers.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, there is provided a computer implemented method. The computer implemented method includes defining a zoned namespace for non-volatile memory (NVM) of a memory device, and mapping persistence logging (PLOG) identifiers (IDs) to the NVM zones. The zoned namespace includes multiple NVM zones of multiple non-overlapping logical block addresses (LBAs) of the NVM, and a PLOG ID identifies a PLOG zone of one or more NVM zones. The method further includes performing a PLOG-specific access operation on a PLOG zone of the NVM in response to a PLOG-specific command received from a host device of the system.

Optionally in the preceding aspect, another implementation provides mapping the PLOG IDs to the NVM zones that maps a PLOG ID to physical block addresses (PBAs) of a PLOG zone corresponding to the PLOG ID.

Optionally in any of the preceding aspects, another implementation provides that the PLOG-specific access operation is a PLOG append operation that writes data and metadata to the PLOG zone of the NVM.

Optionally in the preceding aspect, another implementation provides the PLOG-specific command is a PLOG append command that includes a programmable byte-level append size field that indicates a number of bytes to be appended within the PLOG zone.

Optionally in any of the two preceding aspects, another implementation provides that the PLOG-specific command is a PLOG append command that is byte addressable to any byte within the PLOG zone.

Optionally in any of the preceding aspects, another implementation provides that the PLOG-specific access operation is a PLOG read operation that reads data and metadata from the PLOG zone of the NVM.

Optionally in any of the preceding aspects, another implementation provides that the PLOG-specific command includes a command order number field; and performing a PLOG-specific access operation includes the memory device performing multiple PLOG-specific commands in an order indicated by the order number field.

According to another aspect of the present disclosure, there is provided a memory device that includes NVM and a memory controller. The memory controller includes memory controller processing circuitry configured to map the NVM into multiple NVM zones according to a zoned namespace, the zoned namespace identifying multiple non-overlapping LBAs of the NVM as the multiple NVM zones; map multiple PLOG IDs to the NVM zones, each PLOG ID identifying a PLOG zone of one or more NVM zones; decode a PLOG-specific command received from a host device; and perform a PLOG-specific access operation on one or more PLOG zones of the NVM in response to the PLOG-specific command.

Optionally in any of the preceding aspects, another implementation provides memory controller processing circuitry configured to map the PLOG IDs to physical block addresses (PBAs) of PLOG zones corresponding to the PLOG IDs.

Optionally, in any of the preceding two aspects, another implementation provides memory controller processing circuitry configured to decode a PLOG append command that writes data and metadata to a PLOG zone of the NVM.

Optionally in the preceding aspect, another implementation provides memory controller processing circuitry configured to decode a byte-level append size field included in the PLOG append command, the byte-level append size field indicating a number of bytes to append in the PLOG zone.

Optionally in any of the preceding aspects, another implementation provides the PLOG-specific access operation being a PLOG read operation that reads data and metadata from the PLOG zone of the NVM.

Optionally in any of the preceding aspects, another implementation provides memory controller processing circuitry configured to decode a command order number field in the PLOG-specific command, and perform the PLOG-specific command of multiple commands received by the host device in an order indicated by the order number field.

According to another aspect of the present disclosure, there is provided a computer system that includes a memory device and a host device. The memory device includes NVM and a memory controller including memory controller processing circuitry. The host device includes host device processing circuitry configured to map the NVM into multiple NVM zones according to a zoned namespace that identifies multiple non-overlapping LBAs of the NVM as the multiple NVM zones; map multiple PLOG IDs to the NVM zones, each PLOG ID identifying a PLOG zone of one or more NVM zones; and encode a PLOG-specific command to be performed by the memory controller processing circuitry.

Optionally in any of the preceding aspects, another implementation provides memory controller processing circuitry configured to map the LBAs of a PLOG ID to physical block addresses (PBAs) of a PLOG zone corresponding to the PLOG ID.

Optionally in any of the preceding aspects, another implementation provides host device processing circuitry configured to encode a PLOG append command that writes data and metadata to a PLOG zone of the NVM.

Optionally in the preceding aspect, another implementation provides the PLOG append command including a byte-level append size field to indicate a number of bytes to be appended in the PLOG zone.

Optionally in any of the preceding two aspects, another implementation provides the PLOG append command being byte addressable.

Optionally in any of the preceding three aspects, another implementation provides a PLOG append command that includes a command order number field.

Optionally in any of preceding aspects, another implementation provides host device processing circuitry configured to encode a PLOG read command to read data and metadata from a PLOG zone of the NVM.

BRIEF DESCRIPTION OF THE DRAWINGS

Some figures illustrating example embodiments are included with the text in the detailed description.

FIG. 9 is an illustration of a PLOG Append Command data structure implementing one or more example embodiments.

DETAILED DESCRIPTION

In the following description, reference is made to the accompanying drawings that form a part hereof and, in which are shown, by way of illustration, specific embodiments that may be practiced. These embodiments are described in sufficient detail to enable those skilled in the art to practice the invention, and it is to be understood that other embodiments may be utilized. Structural, logical and/or electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term "logic" encompasses any functionality for performing a task. For instance, each operation illustrated in the flowcharts corresponds to logic for performing that operation. An operation can be performed using software, hardware, firmware, or the like. The terms "component," "system," and the like may refer to computer-related entities, hardware, and software in execution, firmware, or combination thereof. A component may be a process running on a processor, an object, an execution, a program, a function, a subroutine, a computer, or a combination of software and hardware. The term "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term "article of manufacture," as used herein, is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media (i.e., not limited to storage media) may additionally include communication media such as transmission media for wireless signals and the like.

Figure 1:
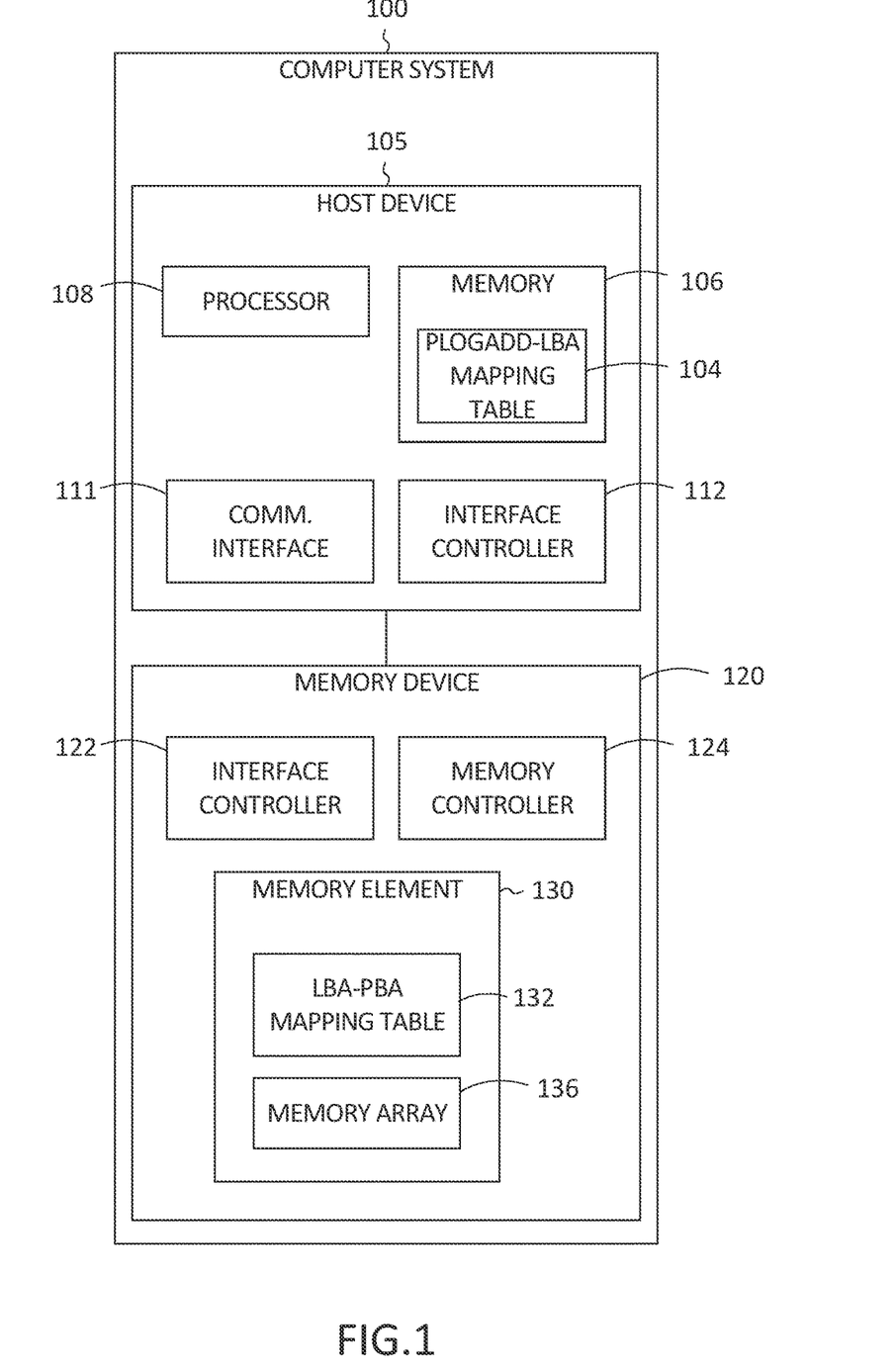
FIG. 1 is a diagram of a computing system implementing an NVM express (NVMe) interface.

FIG. 1 is a diagram of an example of a computing system 100 including a host device 105 and a memory device 120 according to some embodiments. The host device 105 includes memory 106 and a processor 108 (i.e., a processing unit, or one or more other devices, processors, or controllers). The host device 105 includes a communication interface 111 for communicating with external devices and/or networks. The host device 105 is communicatively coupled to the memory device 120 and can exchange data with the memory device 120. For example, the host device 105 can write data to the memory device 120 and/or can read data from the memory device 120. In addition, the host device 105 can control operations of the memory device 120. In some embodiments, the host device 105 can exchange communications with the memory device 120 via the communication interface 111, including reading and/or writing data via the communication interface 111. In other embodiments, the host device 105 can exchange communications with the memory device 120 using only the interface controller 112, without using the communication interface 111.

Each of the host device 105 and the memory device 120 can include the interface controller 112 or 122, such as a NVMe controller 112 or 122. The interface controller 112 or 122 can include a number of receiver or driver circuits (not shown) configured to send or receive signals over the communication interface 111. The interface controller 112 or 122 can include interface circuits, such as data control units, sampling circuits, or other intermedia circuits (not shown) configured to process data. The host device 105 can use the interface controller 112 for exchanging communications between the host device 105 and the memory device 120.

The memory device 120 in the embodiment shown includes the interface controller 122, a memory controller 124, and a memory element 130. The memory controller 124 can comprise an application specific integrated circuit (ASIC), a field programmable gate array (FPGA), or one or more other processing circuits arranged or programmed to manage data transfers or operations to, from, or within the memory array. The memory element 130 comprises a plurality of memory units or cells for storing data. In certain examples, a memory interface circuit (not shown) is positioned between the memory element 130 and the memory controller 124. The memory element 130 can include a memory array 136 (e.g., one or more arrays of non-volatile memory cells, such as a NAND Flash memory array, and/or one or more other memory arrays such as a DRAM memory array). In certain examples, the memory device 120 can include multiple memory, elements 130, each having control logic separate from the memory controller 124.

Figure 2:
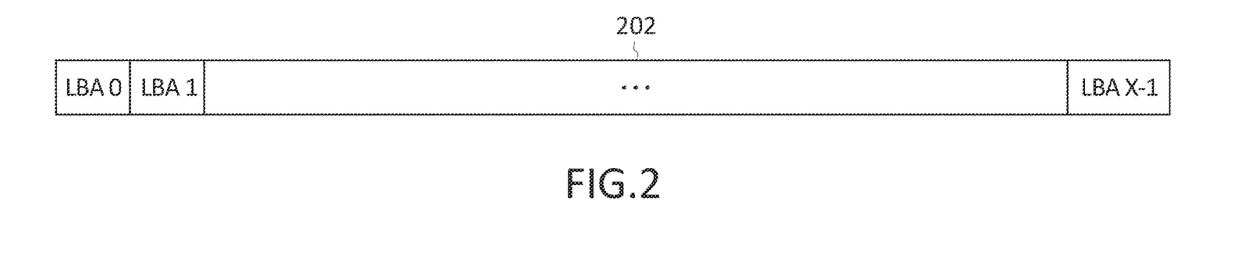
FIG. 2 is a diagram of a conventional non-volatile memory (NVM) address space implementing one or more example embodiments.

FIG. 2 is a diagram of a conventional NVM address space 202 that is logically unified. The NVM address space 202 contains x number of logical block addresses (LBAs). NVMe is a mainstream interface protocol for NAND flash memory. However, NVMe does not meet the needs of large-scale data management that involve thousands of HDDs and SSDs. To address the need for larger scale data management, a zoned address space is used.

Figure 3:
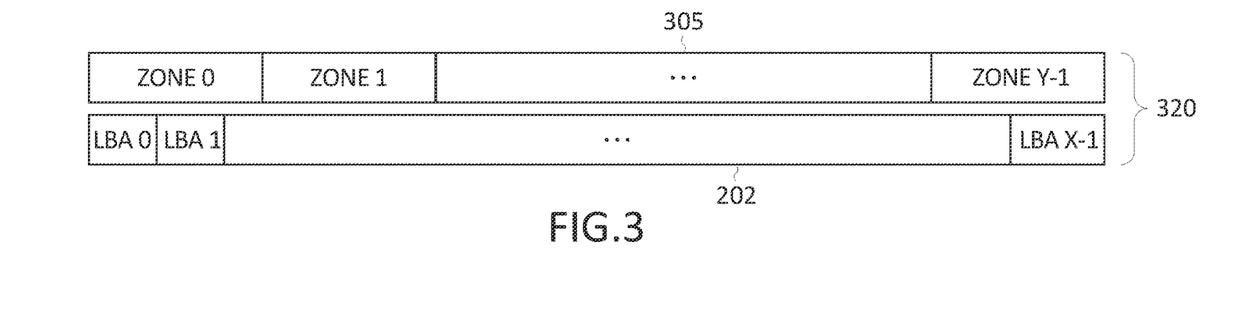
FIG. 3 is a diagram of a zoned address space implementing one or more example embodiments.

FIG. 3 is a diagram of a zoned address space 320 in which the NVM address space 202 in FIG. 2 is divided into y number of zoned namespace (ZNS) zones 305. The y number of ZNS zones 305 are employed to create and define a ZNS, taken with the NV address space 202. Data is sequentially written to the ZNS zones 305 starting from the beginning of the zone and written according to a block size granularity. Before being written into the NVM address space 202 according to the ZNS zones 305, the data is buffered at the host to coalesce the data into aligned blocks. A block is formed to fit to a ZNS zone 305 in some embodiments. Typically, the data is then written into the ZNS zones 305 and the NVM address space 202 using the coalescing buffer and the corresponding mapping table at the host. This block writing by zone is inefficient for SCM and is even more inefficient for distributed memory systems.

To address the inefficiencies, an extension to the ZNS interface protocol called persistence logging (PLOG) over NVMe interface is used. The PLOG over NVMe interface builds on the NVMe ZNS interface to provide a unified interface protocol for storage devices such as HDDs, SSDs, and SCMs.

Figure 4:
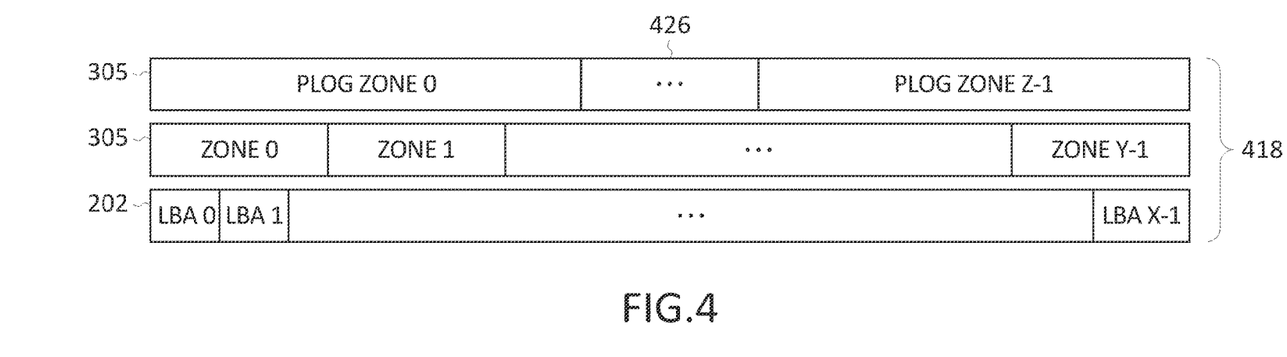
FIG. 4 is a diagram of a persistence logging (PLOG) address space implementing one or more example embodiments.

FIG. 4 is a diagram of a PLOG address space 418 which adds another layer of addressing to the address space. When the ZNS is defined, the ZNS zones 305 are mapped to PLOG identifiers (IDs). The PLOG IDs identify PLOG zones 426, and each of the PLOG zones 426 is mapped to one or more ZNS zones. Therefore, the PLOG IDs identify PLOG zones, the PLOG zones identify ZNS zones, the ZNS zones identify PBAs, and the PBAs point to physical memory locations. As a result of the mapping, a PLOG ID designates a block of physical memory locations, wherein the PLOG ID can be used for block read and block write operations, for example. In the example shown, ay number of ZNS zones 305 are mapped to a z number of PLOG zones 426, where z is equal to or less than y. A host device (e.g., the host device 105 of FIG. 1) can send commands to the memory controller 124 to create a PLOG zone. The size of a PLOG zone 426 is variable, and the command can set the PLOG size and PLOG ID. Writes to the NVM address space 202 can then occur by PLOG zones 426 of varying size.

Figure 5:
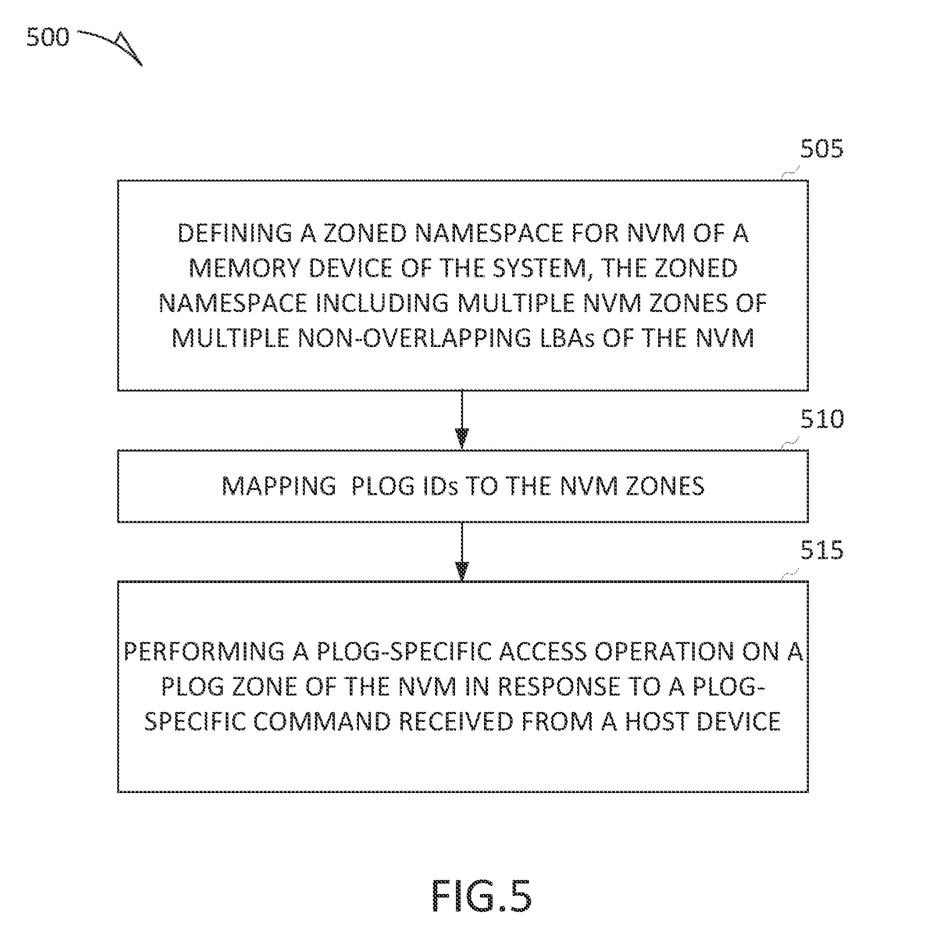
FIG. 5 is a flow diagram of a method of operating a computing system implementing one or more example embodiments.

FIG. 5 is a flow diagram of a method 500 of operating a computing system that includes a memory device (e.g., the memory device 120 of FIG. 1) and a host device (e.g., the host device 105 of FIG. 1). At block 505, a ZNS is defined for NVM of the memory device 120. The ZNS includes multiple NVM zones, each including multiple non-overlapping logical block addresses (LBAs) of the NVM. The ZNS can be defined by the memory controller 124, can be defined by the host device 105, or can be defined by another device performing ZNS Administration (Admin) commands.

At block 510, PLOG IDs are mapped to the NVM zones. Each PLOG ID identifies a PLOG zone of one or more of the NVM zones. As is explained elsewhere herein, the mapping can be performed by the host device 105 or by the memory controller 124 and the mapping can reside in either the host device 105 or the memory device 120. At block 515, a PLOG-specific access operation is performed on a PLOG zone of the NVM in response to a PLOG-specific command received from the host device.

The PLOG-specific command can be a PLOG Read command or a PLOG Write command. The PLOG Read or Write command can specify a PLOG zone to transfer between the memory array and the host memory. Also, the PLOG Read or Write command can be a byte level transfer between the PLOG zone of the memory array and the host memory.

In the example of FIG. 1, the PLOG mapping is performed by the host device 105. The host device memory 106 includes a mapping table 104 generated by the host device 105 that maps the PLOG Address to an LBA. As in a NVMe interface, the LBA and the data are sent via the communication interface 111 to the memory controller 124 of the memory device 120. The memory device 120 includes a LBA-PBA mapping table 132 that maps the LBAs to physical block addresses (PBAs). The memory controller 124 decodes the command and writes the data to the NVM indicated by the PBA.

Figure 6:
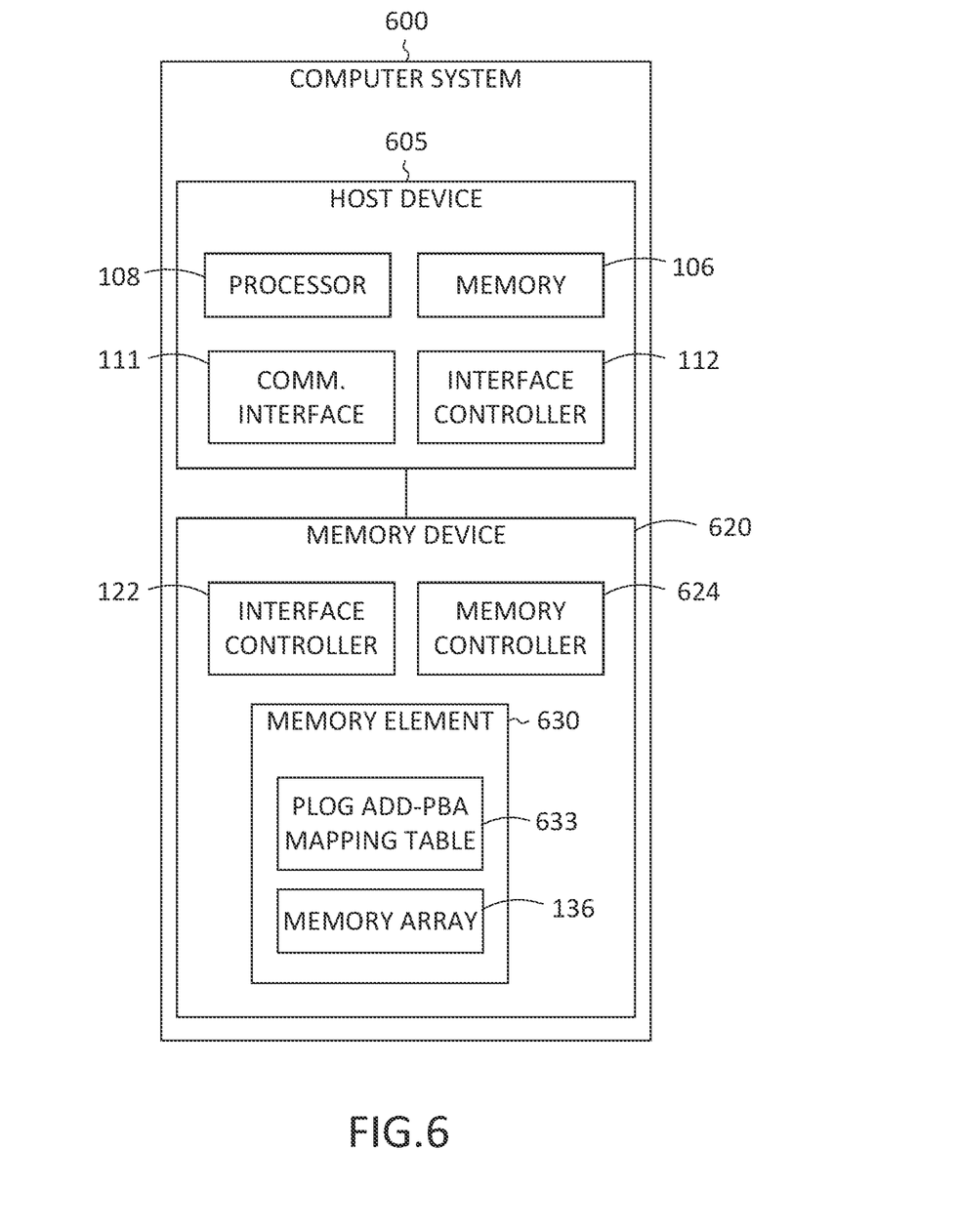
FIGS. 6-8 are block diagrams of computing systems implementing example embodiments.

FIG. 6 is a block diagram of an example of a computing system 600 that includes a host device 605 and a memory device 620 with the PLOG over NVMe interface. In the example of FIG. 6, the PLOG mapping is performed by the memory controller 624. The memory controller 624 generates a mapping table 633 that may be stored in the memory element 630. The mapping table 633 maps the PLOG Address to a PBA. This eliminates one level of indirect mapping by eliminating the PLOG Address-to-LBA and the LBA-to-PBA mapping and replaces it with one PLOG Address-to-PBA mapping. This offloads the mapping and naming service of the PLOG zones to the memory device. This can improve the performance of the system 600.

Figure 7:
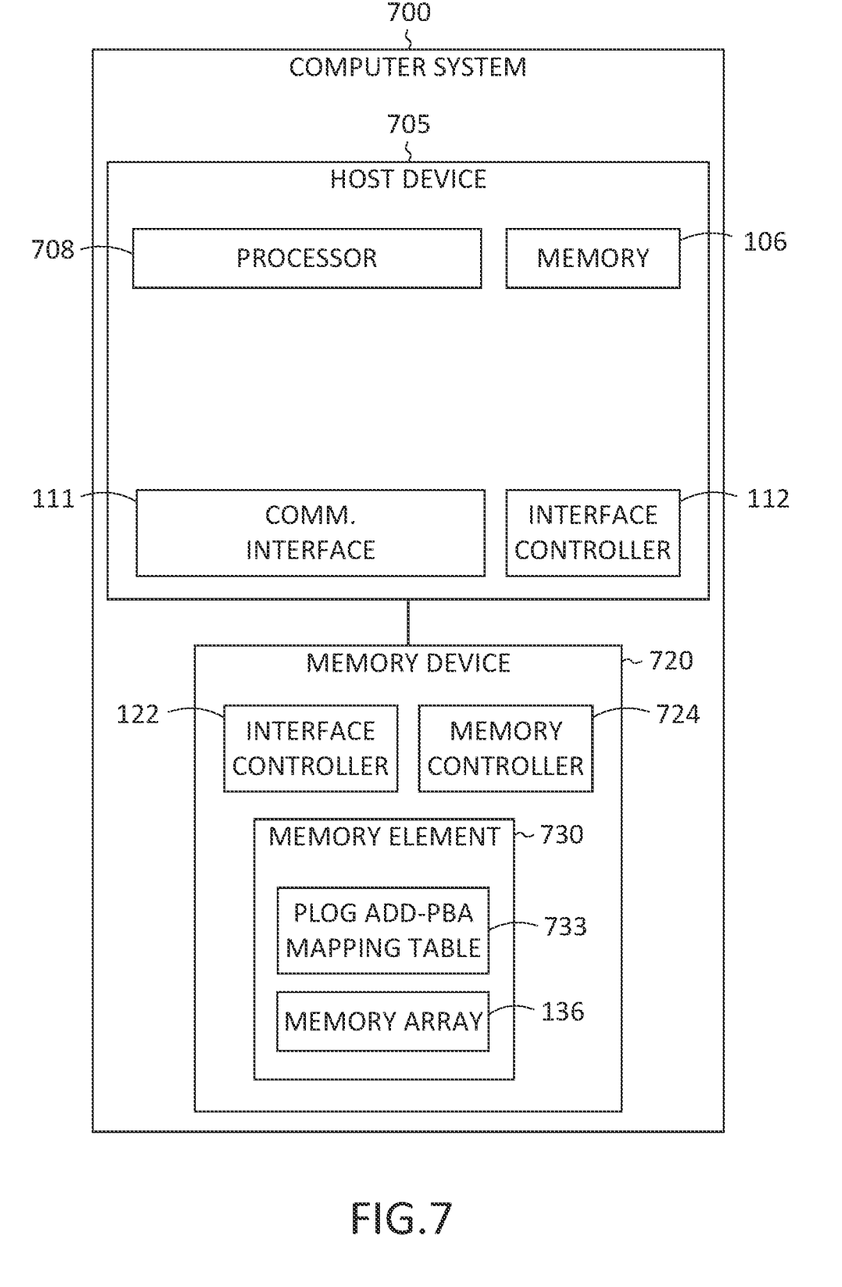

The PLOG over NVMe interface can also offload the ordering to the memory device. FIG. 7 is a block diagram of another example of a computing system 700. As in the example of FIG. 6, the memory element 730 of the memory device 720 includes a map table 733 mapping PLOG Addresses to PBAs generated by the memory controller 724. The host device 705 encodes multiple PLOG Append commands and the commands are sent to the memory device. To preserve order of the commands, the PLOG Append commands include an order number field (e.g., a sequence number or seq #1 to seq #n). The order of the PLOG Append commands and resulting Write transactions from the host device 705 are handled by the memory device 720 without the need of setting the queue depth (e.g., queue depth=1) on write commands, which is typically used to maintain the order of single host transactions in NVMe devices.

Figure 8:
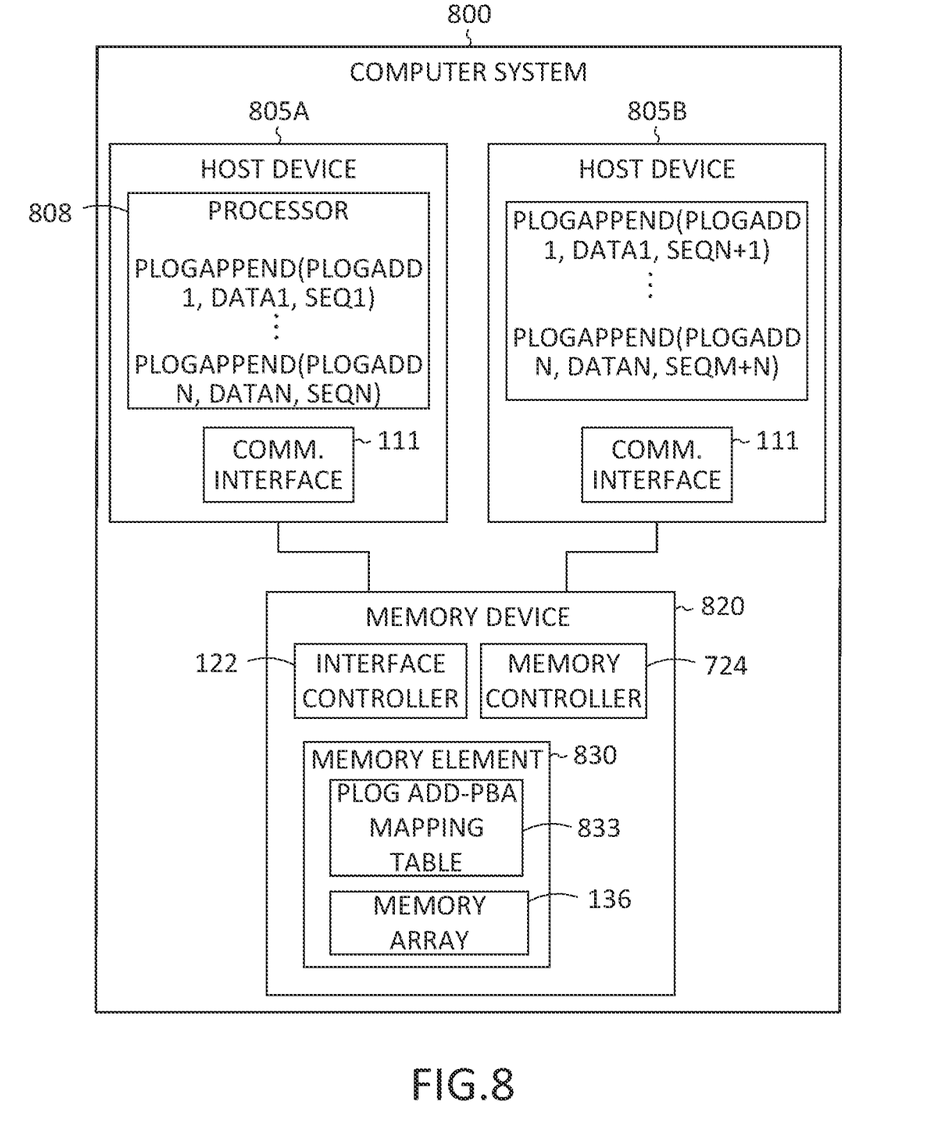

FIG. 8 is a block diagram of another example of a computing system 800. The system 800 includes two host devices (805A, 805B) sending PLOG Append commands to the memory device 820. The example expands on the concepts of the example of FIG. 7. The memory device 820 includes a map table 833 mapping PLOG Addresses to PBAs. The protocol is the same as in FIG. 7 and the memory device 820 enforces order of the commands using the global order number or sequence number across the multiple hosts without need of reservation acquire/release commands, which is typically used to maintain the order of transaction for multiple hosts in NVMe devices.

FIG. 9 is an illustration of an example of a PLOG Append Command data structure 900. The PLOG Append Command data structure 900 includes byte-level append size field 945 to indicate the number of bytes to appended within the PLOG zone. To supporting ordering of commands to the memory device, the PLOG Append Command data structure includes an ordering enable bit 950 to indicate ordering is enabled and includes an order (or sequence) number 955. The PLOG zone start logical block address (PZSLBA) field 952 can define the lowest logical block address for the PLOG zone. In the example of FIG. 9, the PZSLBA field 952 follows the physical region page (PRP) entry fields 947, and the ordering enable bit 950 and append size field 945 follow the PZLSBA field 952, with the append size field 945 following the ordering enable bit 950. The application write order number 955 follows the initial logical block reference tag (ILBRT) field 957.

Figure 10:
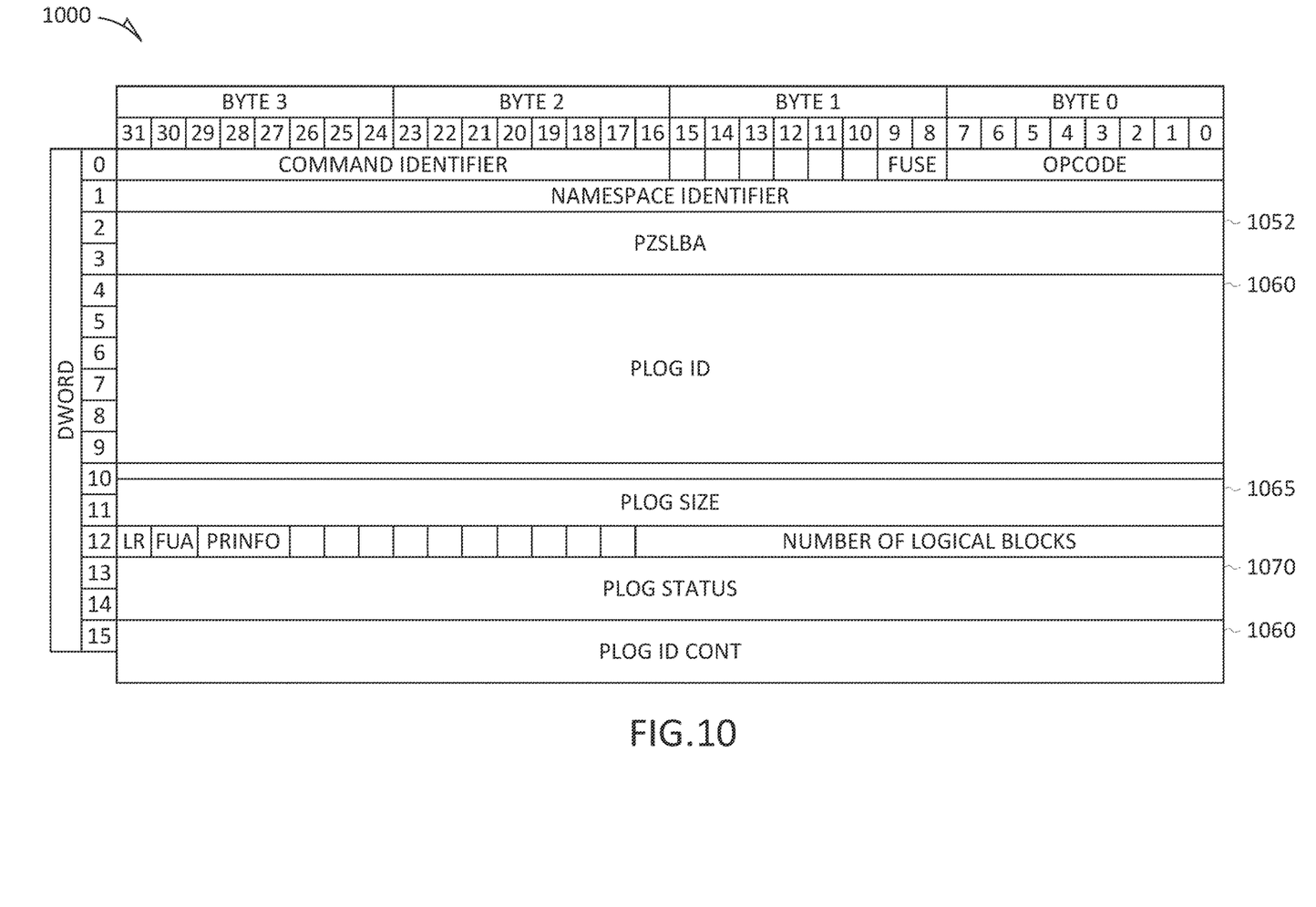
FIG. 10 is an illustration of a PLOG Administration (Admin) Command data structure implementing one or more example embodiments.

FIG. 10 is an illustration of an example of a PLOG Admin Command data structure 1000. The PLOG Admin Command data structure 1000 can be used to implement a PLOG naming service. A PLOG ID 1060 can be mapped to zones of the ZNS. The PLOG Admin Command data structure 1000 can be used to create and delete PLOG zones using PLOG ID 1060 and PLOG size 1065. The PLOG Size 1065 is the number of ZNS zones, and hence the size of a PLOG zone is variable. In variations, the PLOG Admin Command data structure 1000 can indicate a PZSLBA 1052, with the PLOG ID 1060 following the PZSLBA 1052. PLOG Status 1070 can indicate the status of the PLOG zone such as Zone Open, Closed, Empty, Full, Read Only, or Offline for example. The bytes for the PLOG ID 1060 do not have to be contiguous in the PLOG Admin Command data structure 1000 as shown in the example of FIG. 10, and some of the bytes of the PLOG ID 1060 can follow the PLOG Size 1065 and PLOG status 1070.

Figure 11:
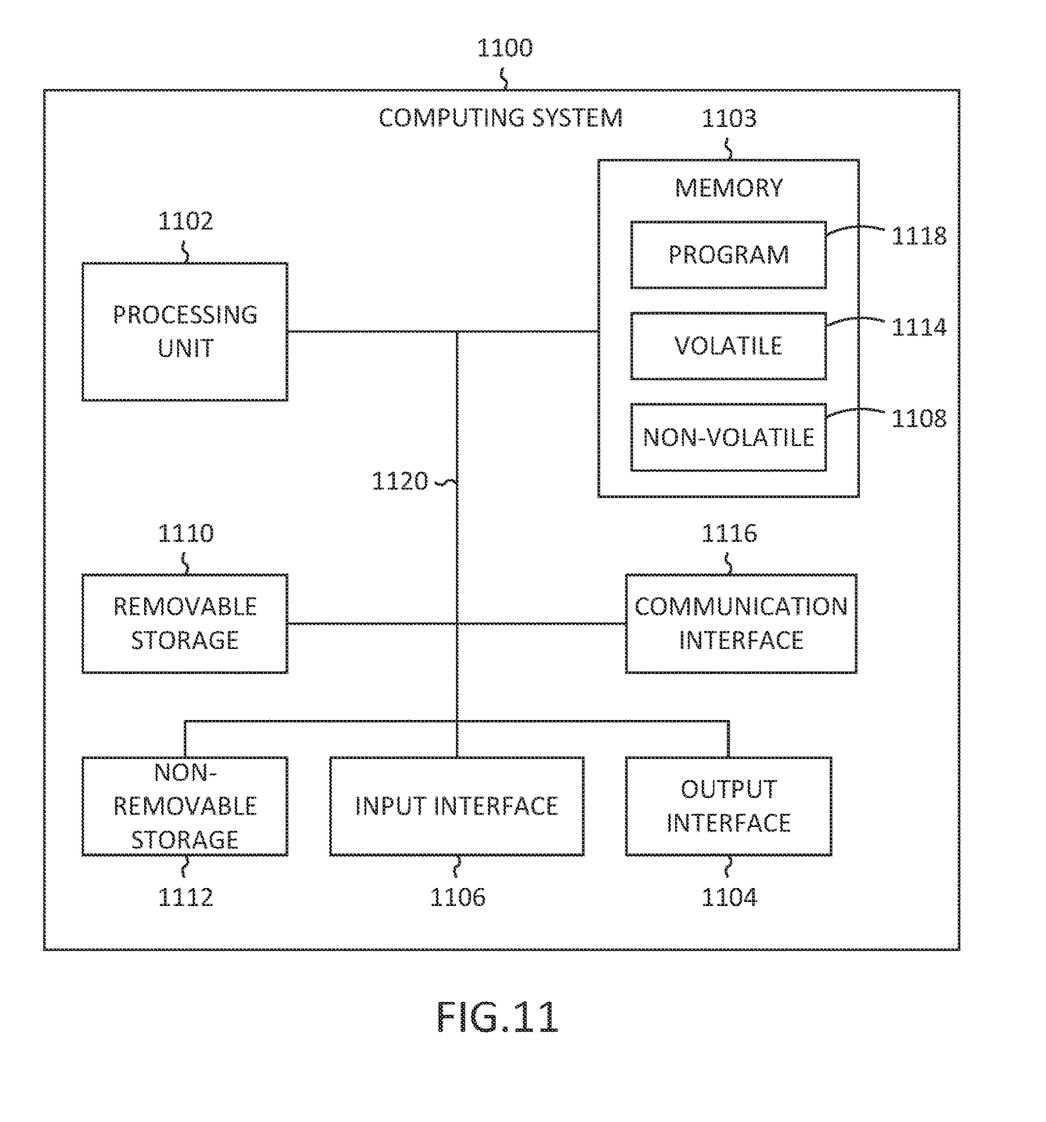
FIG. 11 is a block diagram of another computing system implementing or more example embodiments.

FIG. 11 is a block diagram of a computing system 1100 for performing methods and algorithms according to example embodiments. All components need not be used in various embodiments.

One example is a computing device that may include a processing unit 1102, memory 1103, removable storage 1110, and non-removable storage 1112. Although the example computing device is illustrated and described as computer 1100, the computing device may be in different forms in different embodiments. For example, the computing device may be a host device, a server, a router, or a virtual router.

Although the various data storage elements are illustrated as part of the computer 1100, the storage may also or alternatively include cloud-based storage accessible via a network, such as the Internet or server-based storage. The storage may include an SSD, HDD, or SCM and may include a memory controller on which the parser may be run, allowing transfer of parsed, filtered data through I/O channels between the SSD and main memory.

Memory 1103 may include volatile memory 1114 and non-volatile memory 1108. Computer 1100 may include—or have access to a computing environment that includes—a variety of computer-readable media, such as volatile memory 1114 and non-volatile memory 1108, removable storage 1110 and non-removable storage 1112. Computer storage includes random-access memory (RAM), read-only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1100 may include or have access to a computing environment that includes input interface 1106, output interface 1104, and a communication interface 1116. Output interface 1104 may include a display device, such as a touchscreen, that also may serve as an input device. The input interface 1106 may include one or more of a touchscreen, touchpad, mouse, keyboard, camera, one or more device-specific, buttons, one or more sensors integrated within or coupled via wired or wireless data connections to the computer 1100, and other input devices. The communication interface 1116 exchanges communications with external device and networks. The computer 1100 may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1100 are connected with a system bus 1120.

Computer-readable instructions stored on a computer-readable medium, such as a program 1118, are executable by the processing unit 1102 of the computer 1100. The program 1118 in some embodiments comprises software to implement one or more methods described herein. A hard drive, CD-ROM, and RAM are some examples of articles including a non-transitory computer-readable medium, such as a storage device. The terms computer-readable medium and storage device do not include carrier waves to the extent carrier waves are deemed too transitory. Storage can also include networked storage, such as a storage area network (SAN). Computer program 1118 along with the workspace manager 1122 may be used to cause processing unit 1102 to perform one or more methods or algorithms described herein.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method of operating a computing system, the method comprising:
   defining a zoned namespace for non-volatile memory (NVM) of a memory device of the computing system, the zoned namespace including multiple NVM zones of multiple non-overlapping logical block addresses (LBAs) of the NVM;
   mapping persistence logging (PLOG) zones to the NVM zones, a PLOG zone including a PLOG ID identifying the PLOG zone and a PLOG size indicating a number of one or more NVM zones included in the PLOG zone; and
   performing a PLOG-specific access operation on a PLOG zone of the NVM in response to a PLOG-specific command received from a host device of the computing system.

2. The method of claim 1, wherein the mapping the PLOG IDs to the NVM zones maps a PLOG ID to physical block addresses (PBAs) of a PLOG zone corresponding to the PLOG ID.

3. The method of claim 1, wherein the PLOG-specific access operation is a PLOG append operation that writes data and metadata to the PLOG zone of the NVM.

4. The method of claim 3, wherein the PLOG-specific command is a PLOG append command that includes a programmable byte-level append size field that indicates a number of bytes to be appended within the PLOG zone and is byte addressable to any byte within the PLOG zone.

5. The method of claim 1, further including setting the PLOG zones in the NVM in response to PLOG admin commands received from the host device, the PLOG zones having PLOG IDs and PLOG Sizes indicating a varying number of NVM zones in the PLOG zones.

6. The method of claim 1, wherein the PLOG-specific access operation is a PLOG read operation that reads data and metadata from the PLOG zone of the NVM.

7. The method of claim 1, wherein the PLOG-specific command includes a command order number field, and the performing the PLOG-specific access operation includes the memory device performing multiple PLOG-specific commands in an order indicated by the order number field.

8. A memory device comprising:
   non-volatile memory (NVM); and
   a memory controller including memory controller processing circuitry configured to:
   map the NVM into multiple NVM zones according to a zoned namespace, the zoned namespace identifying multiple non-overlapping logical block addresses (LBAs) of the NVM as the multiple NVM zones;
   map multiple persistence logging (PLOG) zones to the NVM zones, a PLOG zone including a PLOG ID identifying the PLOG zone and a PLOG size indicating a number of one or more NVM zones included in the PLOG zone;
   decode a PLOG-specific command received from a host device; and
   perform a PLOG-specific access operation on one or more PLOG zones of the NVM in response to the PLOG-specific command.

9. The memory device of claim 8, wherein the memory controller processing circuitry is configured to map the PLOG IDs to physical block addresses (PBAs) of a PLOG zone corresponding to the PLOG ID.

10. The memory device of claim 8, wherein the memory controller processing circuitry is configured to decode a PLOG append command that writes data and metadata to a PLOG zone of the NVM.

11. The memory device of claim 10, wherein the memory controller processing circuitry is configured to decode a byte-level append size field included in the PLOG append command, the byte-level append size field indicating a number of bytes to append in the PLOG zone.

12. The memory device of claim 8, wherein the PLOG-specific access operation is a PLOG read operation that reads data and metadata from the PLOG zone of the NVM.

13. The memory device of claim 8, wherein the memory controller processing circuitry is further configured to:
   decode a command order number field in the PLOG-specific command; and
   perform the PLOG-specific command of multiple commands received by the host device in an order indicated by the order number field.

14. A computer system comprising:
   a memory device including:
   non-volatile memory (NVM); and
   a memory controller including memory controller processing circuitry; and
   a host device including host device processing circuitry configured to:
   map the NVM into multiple NVM zones according to a zoned namespace, the zoned namespace identifying multiple non-overlapping logical block addresses (LBAs) of the NVM as the multiple NVM zones;
   map multiple persistence logging (PLOG) zones to the NVM zones, a PLOG zone including PLOG ID identifying the PLOG zone and a PLOG size indicating a number of one or more NVM zones included in the PLOG zone; and
   encode a PLOG-specific command to be performed by the memory controller processing circuitry.

15. The computer system of claim 14, wherein the memory controller processing circuitry is configured to map the LBAs of a PLOG ID to physical block addresses (PBAs) of a PLOG zone corresponding to the PLOG ID.

16. The computer system of claim 14, wherein the host device processing circuitry is configured to encode a PLOG append command that writes data and metadata to a PLOG zone of the NVM.

17. The computer system of claim 16, wherein the PLOG append command includes a byte-level append size field to indicate a number of bytes to be appended in the PLOG zone.

18. The computer system of claim 16, wherein the PLOG append command is byte addressable to any byte within the PLOG zone.

19. The computer system of claim 16, wherein the PLOG append command includes a command order number field.

20. The computer system of claim 14, wherein the host device processing circuitry is configured to encode a PLOG read command to read data and metadata from a PLOG zone of the NVM.

\* \* \* \* \*